Patented Feb. 10, 1942

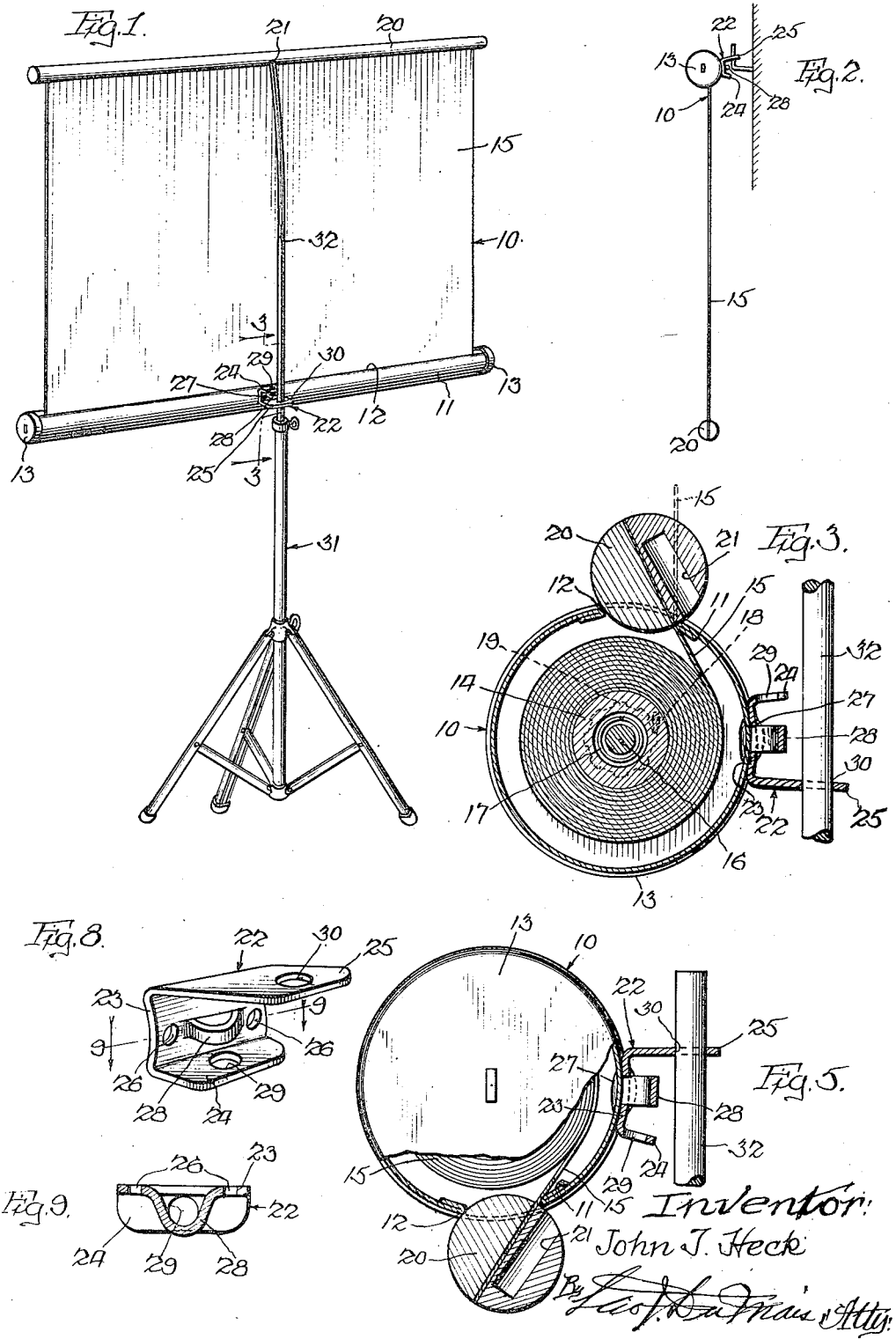

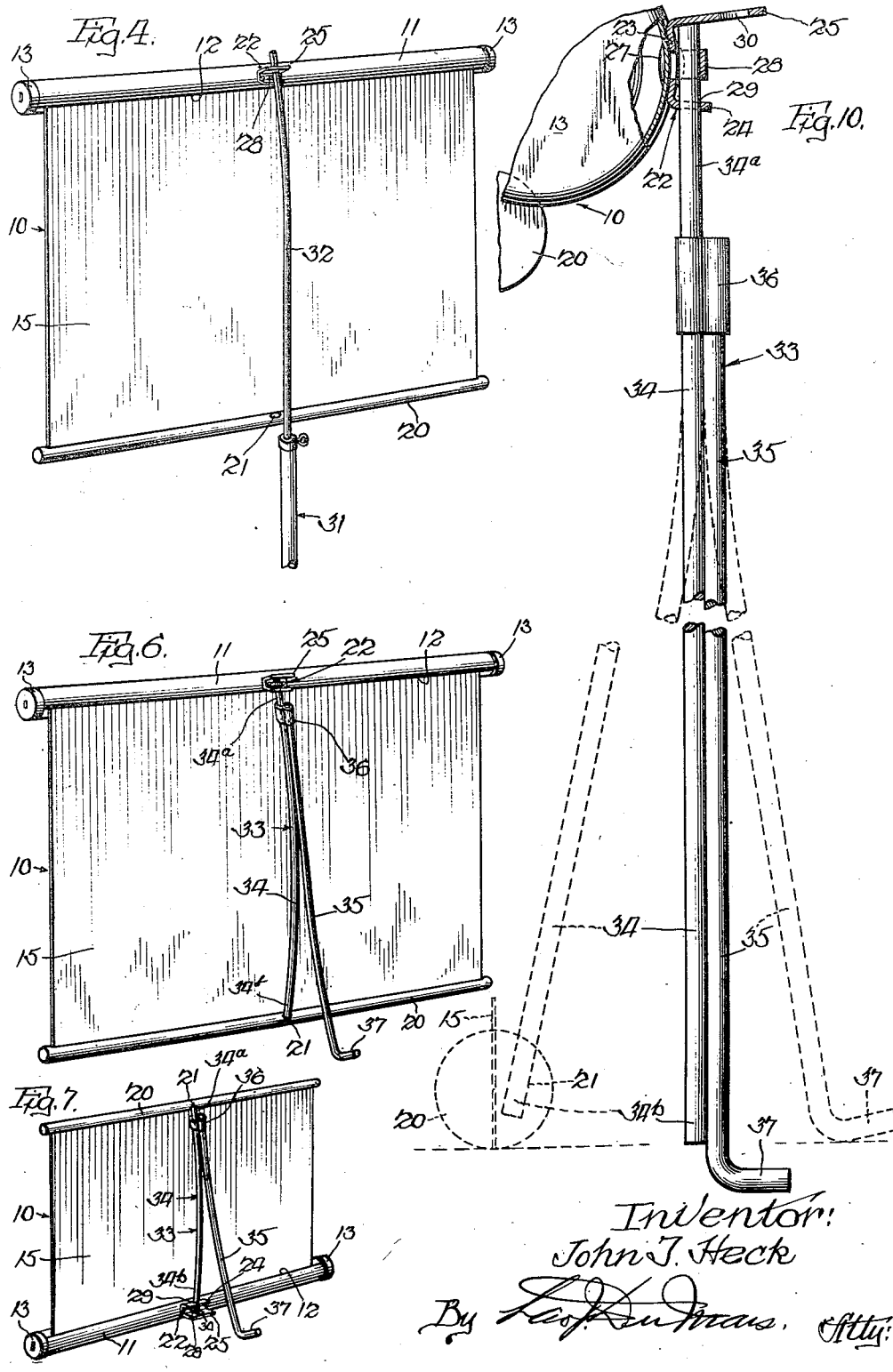

2,272,269

UNITED STATES PATENT OFFICE 2,272,269

PORTABLE PICTURE SCREEN SUPPORTING MEANS

John T. Heck, Elmhurst, Ill., assignor to Da-Lite Screen Company, Inc., Chicago, Ill., a corporation of Illinois Application September 9, 1940, Serial No. 355,966

8 Claims. (Cl. 88—24)

The present invention relates to improvements in a portable picture screen supporting means, and is more particularly directed to a bracket construction arranged and utilized in a manner whereby the screen may be supported in various ways.

Portable picture screens, such as the roller type, have become popular for use in homes, halls and at gatherings of different sorts, where motion pictures are shown, and the important obstacles encountered have been the means for steadily and rigidly positioning and supporting the screen for showing the picture. In showing the picture, the screen must be placed to the best advantage and in such manner that all those present may view the picture being shown.

It is with this thought in mind that the present invention was conceived, and it is now possible to support the roller type of screen under all conditions which may present themselves, and it is therefore an object of the present invention to provide a roller type of picture screen with a bracket arranged and constructed in a manner whereby the screen may be suspended as a drop curtain on either a tripod or wall, or the screen may be supported on a table or on the floor with a support designed to be attached to the bracket.

Another object is the provision of a bracket construction secured to the container of a roller type of picture screen, and which bracket is arranged and constructed to receive various kinds of devices therein for supporting the screen in open position while suspended as a drop curtain, or in inverted position, or while supported on a surface.

A further object is the provision of a bracket construction arranged to be effective for adjustable and gripping movements on a rod, while the tension exerted on the container for opening the screen is in either direction of the bracket, and which bracket also serves as means by which the screen may be suspended.

And a further object is the provision of a stand adapted to coact with the bracket, and for holding the screen in open position while serving as a support for the screen.

Other and further objects will become apparent from the ensuing description and claims.

Referring to the drawings:

Figure 1 is a rear perspective view of a collapsible tripod having a picture screen positioned thereon, and with a bracket embodying the invention.

Figure 2 is a side elevation of the screen as suspended on a wall.

Figure 3 is an enlarged detail cross-sectional view taken substantially on the line 3—3 of Figure 1, illustrating the screen in coiled position.

Figure 4 is a perspective view, illustrating the screen suspended on the tripod as a drop curtain.

Figure 5 is an enlarged detail side elevation partly broken away of the screen in the position shown in Figure 4.

Figure 6 is a rear detail perspective view of the screen positioned as a drop curtain, and with the stand attached thereto for supporting the screen on a table or on the floor.

Figure 7 is a small perspective view similar to Figure 6, illustrating the screen in inverted position and supported by the stand.

Figure 8 is a detail perspective view of the bracket attached to the screen container and by which bracket the screen may be supported in any of the above-mentioned positions.

Figure 9 is a detail plan sectional view taken substantially on the line 9—9 of Figure 8.

Figure 10 is an enlarged detail side elevation partially broken away of Figure 6.

As the type of bracket illustrated renders the wound type of picture screen usable in various ways, a brief description of the picture screen will enable a better understanding of the invention. The screen is designated as a whole as 10, and comprises a container 11 provided with a longitudinally extending slot opening 12 and a cap 13 at each end of the container, and which caps pivotally carry a reel 14 on which the screen web 15 is wound. The reel 14 is provided with a suitable arbor 16 and spring 17 which exerts a tension to retain the screen web 15 in wound position, and the reel being provided with the usual dog lock 18 which coacts with a ratchet wheel 19 fixed to one end of the arbor 16 for locking the screen web at various extended positions. The free end of the screen web is provided with a slat 20, and which slat is provided with a bored opening 21 intermediate its length.

My improved bracket construction, designated as a whole as 22 (Fig. 8), is of U-formation providing a back wall 23 and outwardly directed flanges 24 and 25. The back wall 23 is provided with openings 26—26 near each side edge thereof, and which openings each receive a rivet 27 for securing the bracket to the rearward face of the container 11. Intermediate these openings 26—26, the back wall 23 is provided with a sheared extruded portion 28 which extends between the flanges 24—25 and cooperates with an opening 29 in the flange 24 to receive the end of a rod therein, as will be later described.

The flange 25 is preferably longer than flange 24 and is provided adjacent its outer edge and centrally thereof with an opening 30, which is also adapted to receive a rod therethrough.

Referring more particularly to Figs. 1 and 4, the screen is illustrated as supported on a tripod 31, which has an adjustable rod 32 of a size to closely fit the opening 30 in the flange 25 of the bracket 22. When the screen is in position (Fig. 1), the weight of the screen and container causes the edge of the opening 30 of the bracket 22 to bite and grip the rod, then, as the screen web 15 is uncoiled, the container is rocked due to the resistance of the spring 17, which causes the edge of the opening 30 of the bracket to bite the rod 32 to retain the container 11 on the rod and permit the screen web 15 to be drawn to open position against the tension of its spring 17, and the slat 20 at the free end of the screen web may then be positioned over the upper end of rod 32 which is received in the opening 21 of the slat.

The screen 10 may be supported on the tripod 31 as a drop curtain (Figs. 4 and 5), or may be supported on the tripod in inverted position (Figs. 1 and 3). It is, when in inverted position, that the opening 21 in the slat 20 of the screen web is utilized and positioned over the end of the tripod rod 32 for retaining the screen web 15 in taut open position, and when the screen is supported on the tripod as a drop curtain, the weight of the slat 20 retains the curtain taut.

In either of the above-pointed out positions of the screen while on the tripod, the opening 30 in the flange 25 of the bracket 22 receives the rod 32 of the tripod, and either by the weight of the screen or by a tension exerted to the container 11 thereof, the edge of this opening 30 will effect a bite on the rod 32 to retain the container 11 in the position in which it has been placed on the rod.

The bracket 22 also renders it possible to support the screen 10 as a drop curtain, or in inverted position on a table or other surface by reason of the formation of the bracket to receive an attachable stand designated as 33. This stand 33 comprises a pair of rods 34—35 secured in juxtaposition by means of a clip 36 and with the ends of the rods out of alignment so that the rod 34 extends an appreciable distance above the clip providing an extension 34a, and the rod 35 is arranged to extend a distance below the end 34b of the rod 34 and is formed to provide a foot 37. The stand 33 has the extending end 34a thereof of a size to be received through the opening 29 of the flange 24 and through the extruded portion 28 with the end of the rod in abutting engagement with the flange 25 of the bracket 22. After the rod is thus attached to the bracket, the rods 34 and 35 are spread apart and the free end 34b of rod 34 is inserted into opening 21 of the slat 20 (Figs. 6 and 10) to retain the screen web 15 in uncoiled position and with the slat 20 serving as the base by which to guide the screen 10 from sidewise tipping movement, while the rod 35 of the stand 33 extends an appreciable distance rearwardly of the screen and serves to support the same against backward tipping movements.

The stand 33 may also be positioned in a manner to support the screen in inverted position (Fig. 7) and in which instance, the end 34b of the rod 34 is received through opening 29 and extruded portion 28 of the bracket 22, and the extension 34a of the rod 34 is received in the opening 21 of the slat 20. In this instance, the container 11 is at rest on the surface and the rod 35 serves in the same manner as above described to support the screen in raised position and against tipping movements.

In either of the positions in which the container is supported, the bracket 22 is employed, and serves in each instance to retain the container against movement during the reeling and unreeling of the screen web.

I claim:

1. In a portable picture screen supporting means of the character described, the combination of a supporting rod, a container having a screen web wound therein and mounted horizontally of said supporting rod, a U-shaped bracket fixed on said container and having its flanges provided with misaligned rod-receiving openings, an extruded portion on said bracket coacting with the opening of one of the flanges for receiving the rod therethrough in abutting relation with the other flange, the opening of the other flange being arranged to receive and for sliding movements on said supporting rod and serving to lock the container against sliding movement on said rod upon the unwinding movement of said screen web.

2. In a portable picture screen supporting means of the class described, the combination with a container having a screen web wound therein, a U-shaped bracket having its wall secured intermediate and length of said container, the flanges of said U-shaped bracket being provided with misaligned rod-receiving openings, a rod, an extruded portion on said bracket coacting with the opening of one of the flanges for aligning said rod positioned therethrough in abutting relation with the other flange, and the opening of the other flange serving to receive and closely fit said rod whereby to frictionally grip said rod upon a rocking movement of the container during the unwinding of the screen web.

3. In a portable picture screen supporting means of the character described, the combination of an upright supporting rod, a container having a spring reel and a screen web wound thereon, a U-shaped bracket secured intermediate the length of said container and provided with misaligned openings in the flanges thereof one of which openings being arranged to receive said rod and the other of said openings to slidably engage said rod, an extruded portion on said bracket coacting with the opening in one of the flanges for holding said rod in abutting relation with the other flange, the opening in the other flange of said bracket serving to frictionally engage said rod and lock the container against sliding movement on said rod upon the unwinding movement of said screen web against the tension of the spring reel.

4. In a portable picture screen supporting means of the class described, the combination with a supporting rod, a container having a wound screen web therein, a substantially U-shaped bracket secured intermediate the length of said container and with the flanges thereof provided with misaligned rod-receiving openings, an extruded portion on said bracket coacting with the opening of one of the flanges for aligning the rod positioned therethrough in abutting relation with the other flange, and a slat secured to the free end of said screen web and having an opening intermediate its length to receive the free end of said rod for maintaining a predetermined length of web unwound from said container.

5. In a portable picture screen supporting means of the character described, the combination with a supporting rod, a container having a screen web wound therein and arranged to be mounted horizontally of said rod, said mounting comprising a U-shaped bracket fixed to said container and having openings in the flanges thereof to receive said rod therein from opposite sides thereof, an extruded portion on said bracket coacting with the opening of the flange for guiding the rod therethrough in abutting relation with the other flange, and a slat secured to said web and having means thereon for attaching the same to the free end of said rod for holding a definite length of web unwound from the container.

6. In a portable picture screen supporting means of the class described, the combination with a container having a screen web and a reel upon which the web is wound, a U-shaped bracket secured intermediate the length of said container and the flanges of said bracket being of different lengths and provided with misaligned openings, a rod, an extruded portion on said bracket coacting with the opening of the shorter flange for aligning said rod positioned therethrough at a right angle to the container and in abutting relation with the other flange, and a slat on the free end of the screen web including means for attaching said slat to the other end of the rod.

7. In a portable picture screen supporting means of the class described, the combination with a container having a screen web, and a reel upon which the web is wound, a U-shaped bracket secured intermediate the length of said container and the flanges of said bracket being of different lengths and provided with misaligned openings, a rod, an extruded portion of said bracket extending intermediate the flanges and formed to coact with the opening of the shorter flange for aligning said rod positioned therethrough in abutting relation with the longer flange, and a slat fixed to the free end of the screen web including means on said slat for attaching the same to the free end of said rod, the length of the rod determining the length of screen web unwound from said reel.

8. In a portable picture screen supporting means of the class described, the combination with a container having a pivoted reel and a screen web wound thereon, a bracket secured intermediate the length of said container and having a pair of flanges of different lengths and being each provided with an opening adjacent its outer edge, a rod, an extruded portion on said bracket extending between the pair of flanges and coacting with the opening of one of the flanges for receiving and aligning said rod positioned therethrough at a right angle to said bracket and container and with the end of the rod in abutting relation with the other flange, and a slat on the free end of the screen web and arranged to be attached to the other end of the rod.

JOHN T. HECK.